(12) United States Patent
Heidari-Bateni et al.

(10) Patent No.: US 8,422,483 B2
(45) Date of Patent: Apr. 16, 2013

(54) METHOD AND SYSTEM FOR CHANNEL ESTIMATION IN BURST MODE

(75) Inventors: Ghobad Heidari-Bateni, San Diego, CA (US); Abu Amanullah, San Diego, CA (US); Dumitru Mihai Ionescu, San Diego, CA (US)

(73) Assignee: Olympus Corporation, Tokyo (JP)

( * ) Notice: Subject to any disclaimer, the term of this patent is extended or adjusted under 35 U.S.C. 154(b) by 1203 days.

(21) Appl. No.: 11/694,575

(22) Filed: Mar. 30, 2007

(65) Prior Publication Data
US 2008/0240261 A1 Oct. 2, 2008

(51) Int. Cl.
*H04J 3/06* (2006.01)
(52) U.S. Cl.
USPC ........................................................ 370/350
(58) Field of Classification Search ................ 370/252, 370/343, 341
See application file for complete search history.

(56) References Cited

U.S. PATENT DOCUMENTS

| | | | | |
|---|---|---|---|---|
| 4,052,670 | A * | 10/1977 | Watanabe et al. | 370/324 |
| 6,442,129 | B1 | 8/2002 | Yonge, III et al. | |
| 6,507,602 | B1 * | 1/2003 | Dent | 375/142 |
| 6,577,645 | B2 * | 6/2003 | Meyer et al. | 370/468 |
| 6,654,429 | B1 | 11/2003 | Li | |
| 6,700,919 | B1 * | 3/2004 | Papasakellariou | 375/130 |
| 6,868,112 | B2 * | 3/2005 | Kim et al. | 375/147 |
| 6,990,061 | B2 * | 1/2006 | Deneire et al. | 370/210 |
| 7,031,274 | B2 | 4/2006 | Sherman | |
| 7,039,004 | B2 | 5/2006 | Sun et al. | |
| 7,113,499 | B2 * | 9/2006 | Nafie et al. | 370/349 |
| 7,522,562 | B2 * | 4/2009 | Kent et al. | 370/334 |
| 2003/0081695 | A1 * | 5/2003 | Eilts et al. | 375/316 |
| 2003/0128656 | A1 | 7/2003 | Scarpa | |
| 2004/0066773 | A1 | 4/2004 | Sun et al. | |
| 2004/0086055 | A1 | 5/2004 | Li | |
| 2004/0151145 | A1 | 8/2004 | Hammerschmidt | |
| 2004/0190438 | A1 | 9/2004 | Maltsev et al. | |
| 2004/0190560 | A1 | 9/2004 | Maltsev et al. | |
| 2004/0240376 | A1 | 12/2004 | Wang et al. | |
| 2004/0264565 | A1 | 12/2004 | MacInnis | |
| 2005/0135308 | A1 | 6/2005 | Vijayan et al. | |
| 2005/0141407 | A1 | 6/2005 | Sandhu | |
| 2005/0186933 | A1 | 8/2005 | Trans | |
| 2005/0226341 | A1 | 10/2005 | Sun et al. | |
| 2006/0176802 | A1 | 8/2006 | Ko et al. | |
| 2006/0198434 | A1 | 9/2006 | Chen et al. | |
| 2006/0211377 | A1 | 9/2006 | Shoemake et al. | |
| 2007/0030919 | A1 | 2/2007 | Li | |
| 2008/0101439 | A1 * | 5/2008 | Huang et al. | 375/136 |
| 2008/0181095 | A1 * | 7/2008 | Zangi | 370/208 |

* cited by examiner

*Primary Examiner* — Mark Rinehart
*Assistant Examiner* — Mohammad Anwar
(74) *Attorney, Agent, or Firm* — Sheppard Mullin Richter & Hampton LLP

(57) ABSTRACT

The present invention is directed to a system and method for channel estimation for a communication channel such as, for example, that found in a wireless communication network. One or more channel estimates or channel observables can be combined to compute a refined channel estimate, for example, when the channel estimates or channel observables are from the same channel.

32 Claims, 11 Drawing Sheets

Fig. 4

| Leading symbols in the PFS Sequence | Band #1 PFS | Band #1 PFS | Band #2 PFS | Band #2 PFS | Band #3 PFS | Band #3 PFS | Band #1 CE | Band #1 CE | Band #2 CE | Band #2 CE | Band #3 CE | Band #3 CE | PLCP | PSDU |
|---|---|---|---|---|---|---|---|---|---|---|---|---|---|---|

| Leading symbols in the PFS Sequence | Band #1 PFS | Band #2 PFS | Band #3 PFS | Band #1 PFS | Band #2 PFS | Band #3 PFS | Band #1 CE | Band #2 CE | Band #3 CE | Band #1 CE | Band #2 CE | Band #3 CE | PLCP | PSDU |
|---|---|---|---|---|---|---|---|---|---|---|---|---|---|---|

202 / 215

METHOD AND SYSTEM FOR CHANNEL ESTIMATION IN BURST MODE

TECHNICAL FIELD

The present invention relates to wireless communication and more particularly, some embodiments relate to channel estimation for frequency-hopped signals.

DESCRIPTION OF THE RELATED ART

With the many continued advancements in communications technology, more and more devices are being introduced in both the consumer and commercial sectors with advanced communications capabilities. Additionally, advances in processing power and low-power consumption technologies, as well as advances in data coding techniques have led to the proliferation of wired and wireless communications capabilities on a more widespread basis.

For example, communication networks, both wired and wireless, are now commonplace in many home and office environments. Such networks allow various heretofore-independent devices to share data and other information to enhance productivity or simply to improve their convenience to the user. One such communication network that is gaining widespread popularity is an exemplary implementation of a wireless network such as that specified by the WiMedia-MBOA (Multiband OFDM Alliance). Other exemplary networks include the Bluetooth® communications network and various IEEE standards-based networks such as 802.11 and 802.16 communications networks.

Architects of these and other networks, and indeed communications channels in general, have long struggled with the challenge of managing multiple communications across a limited channel. For example, in some environments, more than one device may share a common carrier channel and thus run the risk of encountering a communication conflict between the one or more devices on the channel.

Over the years, network architects have come up with various solutions to arbitrate disputes or otherwise delegate bandwidth among the various communicating devices, or clients, on the network. Schemes used in well known network configurations such as token rings, Ethernet, and other configurations have been developed to allow sharing of the available bandwidth. In addition to these schemes, other techniques have been employed, including for example CDMA (code division multiple access) and TDMA (time division multiple access) for cellular networks.

FDM (Frequency Division Multiplexing) is a technology that enables multiple devices to transmit their signals simultaneously over a communication channel in a wired or wireless setting. The devices' respective signals travel within their designated frequency band (carrier), onto which the data (text, voice, video, or other data) is modulated. With adequate separation in frequency band spacing, multiple devices can simultaneously communicate across the same communication channel (network or point-to-point).

Orthogonal Frequency Division Multiple Access (OFDMA), is a digital multi-carrier modulation scheme, which modulates the data onto a plurality of closely-spaced orthogonal sub-carriers. Each sub-carrier is modulated with a conventional modulation scheme (such as, for example, quadrature amplitude modulation). Preferably, this can be done at a low symbol rate, maintaining data rates similar to conventional single-carrier modulation schemes in the same bandwidth. In practice, OFDM signals are generated using a Fast Fourier transform. OFDM can provide some immunity to adverse channel conditions including, for example, multi-path without the need for complex equalization filters. One reason is that an OFDM transmission can be thought of as a plurality narrowband, low data rate signals, rather than a single high data rate wideband signal.

OFDM is typically utilized as a modulation scheme, rather than a mechanism for sharing bandwidth among multiple users. However, OFDM can be combined with multiple access techniques. In Orthogonal Frequency Division Multiple Access (OFDMA), frequency-division multiple access is achieved by assigning different OFDM sub-channels to different users Spread spectrum techniques such as frequency hopping can be used to further enhance the performance of the communication channel. Advantages of such techniques might include: (1) averaging noise and interference over multiple frequencies, thereby increasing resistance to noise and interference; (2) frequency hopped signals are difficult to intercept; (3) frequency hopped signals can share frequency bands with other signals thereby increasing use of bandwidth; and (4) frequency hopped signals provide for extra transmission power.

Information transmitted over wireless networks is susceptible to various factors that cause degradation of the signal. Without compensating systems, multipath interference is characteristic of the transmission of signals along multiple paths in a multi-carrier communication system. Often this may result is degradation and fluctuation of signals on a given frequency band. To ameliorate this effect, and primarily to employ coherent detection, systems will typically employ channel estimation for coherent detection and decoding, thereby mitigating the effects of signal fluctuation. A wireless device might be implemented to compute a channel estimate before operating on the signal to compensate for malignant effects.

In the WiMedia standard, the physical layer specification calls for a plurality of channel estimation symbols to be used to compute the channel estimates for the signal. According to the standard, six OFDM symbols dedicated to channel estimation (CE) are transmitted in each packet and used for estimating the channel. FIG. 1 is a diagram illustrating a structure of an example packet in accordance with the WiMedia PHY specification. The illustrated example packet 200 contains three segments, a preamble 201, a PLCP header 220 segment and a PSDU 225 segment. The preamble 201 is divided among a packet/frame synchronization (PFS) sequence 202 and a channel estimation (CE) sequence 215. The preamble contains 24 PFS symbols and six CE symbols. In another example, the packet is a burst packet and may contain 12 PFS symbols and six CE symbols. The WiMedia specifies using the PFS symbols for packet detection and coarse time/frequency estimation, and using CE symbols for channel estimation and fine time/frequency estimation.

BRIEF SUMMARY OF EMBODIMENTS OF THE INVENTION

According to one embodiment of the invention, channel estimation may be accomplished for a received packet by obtaining a first set of one or more frame synchronization symbols from the packet; obtaining a second set of one or more channel estimation symbols; and combining the first set of frame synchronization symbols and the second set of channel estimation symbols to determine a channel estimate for the received packet. In one embodiment, the channel is a frequency-hopped channel and a first and second set of packets is obtained for each band. The combining operation might include in one embodiment averaging the symbols for a given frequency band. The method might further include performing a Fourier transformation on the symbols prior to combining the symbols. In one embodiment, the first and second sets of symbols are distributed in the packet in predetermined locations based on frequency band.

In one embodiment, packet frame synchronization might be performed in parallel with, or in series with, the process of determining a channel estimate provided that this streamlining allows for removal of relevant frequency offsets. Additionally, symbol synchronization might be performed before performing the Fourier transformation. As another alternative, the Fourier transformation might be performed before performing frame synchronization.

In yet another embodiment, a system configured for channel estimation, includes a communications receiver configured to receive packetized information; and a channel estimation module coupled to the communication receiver and configured to perform channel estimation; wherein the channel estimation is performed using a combination of a first set of one or more frame synchronization symbols and a second set of one or more channel estimation symbols. In one embodiment, the channel estimation module might be configured to determine a position of a PFS symbol for a given band within the packet. The channel might be a frequency-hopped channel and a first and second set of packets is obtained for each band.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 4 is a diagram illustrating one example of a PSF and CE sequence in accordance with one embodiment of the invention.

FIG. 8 is a diagram illustrating one example of a PSF and CE sequence in accordance with one embodiment of the invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a system and method for channel estimation. In one embodiment, the present invention is directed toward a system and method for conducting channel estimation in connection with frequency hopped packet transmissions. In accordance with one embodiment, additional symbols are allocated to the task of channel estimation for frequency-hopped transmissions to allow more symbols to be shared among the plurality of frequencies used in the transmission.

Figure 2:
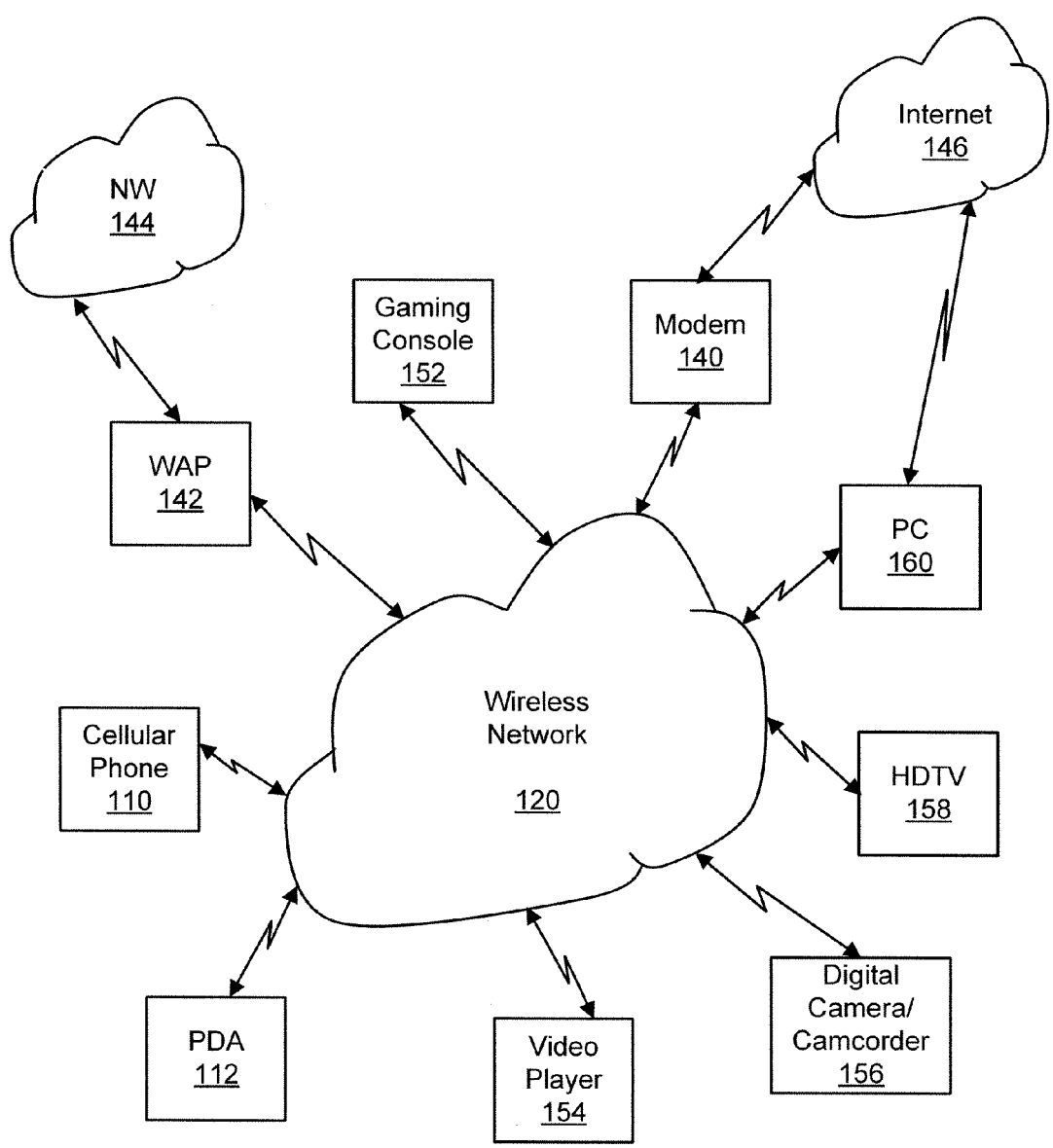
FIG. 2 is a diagram illustrating one possible configuration of a wireless network that might serve as an example environment in which the present invention can be implemented.

Before describing the invention in detail, it is useful to describe an example environment with which the invention can be implemented. One such example is that of a wireless network. FIG. 2 is a block diagram illustrating one possible configuration of a wireless network that can serve as an example environment in which the present invention can be implemented. Referring now to FIG. 2, a wireless network 120 is provided to allow a plurality of electronic devices to communicate with one another without the need for wires or cables between the devices. A wireless network 120 can vary in coverage area depending on a number of factors or parameters including, for example, the transmit power levels and receive sensitivities of the various electronic devices associated with the network. Examples of wireless networks can include the various IEEE and other standards as described above, as well as other wireless network implementations. Another example of a wireless network is that specified by the WiMedia standard (within the WiMedia and Multi-Band OFDM Alliance). From time-to-time, the present invention is described herein in terms of wireless network. Description in terms of these environments is provided to allow the various features and embodiments of the invention to be portrayed in the context of an exemplary application. After reading this description, it will become apparent to one of ordinary skill in the art how the invention can be implemented in different and alternative environments. Indeed, applicability of the invention is not limited to a wireless network, nor is it limited to a WiMedia standard described as one implementation of the example environment.

With many applications, the wireless network 120 operates in a relatively confined area, such as, for example, a home or an office. The example illustrated in FIG. 2 is an example of an implementation such as that which may be found in a home or small office environment. Of course wireless communication networks and communication networks in general are found in many environments outside the home and office as well. In the example illustrated in FIG. 1, wireless network 120 includes a communication device to allow it to communicate with external networks. More particularly, in the illustrated example, wireless network 120 includes a modem 140 to provide connectivity to an external network such as the Internet 146, and a wireless access point 142 that can provide external connectivity to another network 144.

Also illustrated in the example wireless network 120 are portable electronic devices such as a cellular telephone 110 and a personal digital assistant (PDA) 112. Like the other electronic devices illustrated in FIG. 1, cellular telephone 110 and PDA 112 can communicate with wireless network 120 via the appropriate wireless interface. Additionally, these devices may be configured to further communicate with an external network. For example, cellular telephone 110 is typically configured to communicate with a wide area wireless network by way of a base station.

Figure 1:
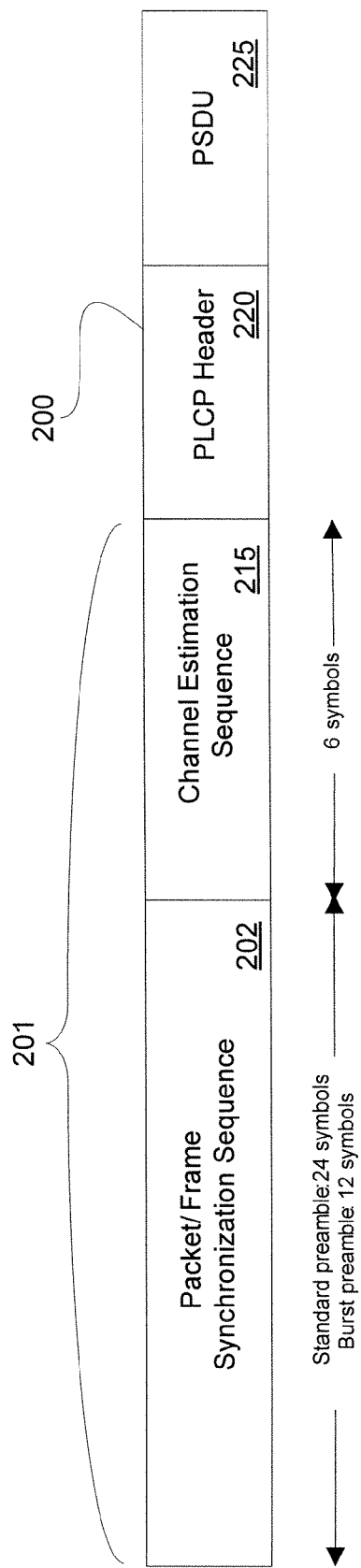
FIG. 1 is a diagram illustrating an example packet in accordance with the WiMedia PHY specification.

Additionally, the example environment illustrated in FIG. 1 also includes examples of home entertainment devices connected to wireless network 120. In the illustrated example, electronic devices such as a gaming console 152, a video player 154, a digital camera/camcorder 156, and a high definition television 158 are illustrated as being interconnected via wireless network 120. For example, a digital camera or camcorder 156 can be utilized by a user to capture one or more still picture or motion video images. The captured images can be stored in a local memory or storage device associated with digital camera or camcorder 156 and ultimately communicated to another electronic device via wireless network 120. For example, the user may wish to provide a digital video stream to a high definition television set 158 associated with wireless network 120. As another example, the user may wish to upload one or more images from digital camera 156 to his or her personal computer 160 or to the Internet 146. This can be accomplished by wireless network 120. Of course, wireless network 120 can be utilized to provide data, content, and other information sharing on a peer-to-peer or other basis, as the provided examples serve to illustrate.

Also illustrated is a personal computer 160 or other computing device connected to wireless network 120 via a wireless air interface. As depicted in the illustrated example, personal computer 160 can also provide connectivity to an external network such as the Internet 146.

In the illustrated example, wireless network 120 is implemented to provide wireless connectivity to the various electronic devices associated therewith. Wireless network 120 allows these devices to share data, content, and other information with one another across wireless network 120. Typically, in such an environment, the electronic devices would have the appropriate transmitter, receiver, or transceiver to allow communication via the air interface with other devices associated with wireless network 120. These electronic devices may conform to one or more appropriate wireless standards and, in fact, multiple standards may be in play within a given neighborhood. Electronic devices associated with the network typically also have control logic or modules configured to manage communications across the network and to manage the operational functionality of the electronic device. Such control logic can be implemented using hardware, software, or a combination thereof. For example, one or more processors, ASICs, PLAs, and other logic devices or components can be included with the device to implement the desired features and functionality. Additionally, memory or other data and information storage capacity can be included to facilitate operation of the device and communication across the network.

Electronic devices operating as a part of wireless network 120 are sometimes referred to herein as network devices, members or member devices of the network or devices associated with the network. In one embodiment, devices that communicate with a given network may be members or merely in communication with the network.

Figure 3:
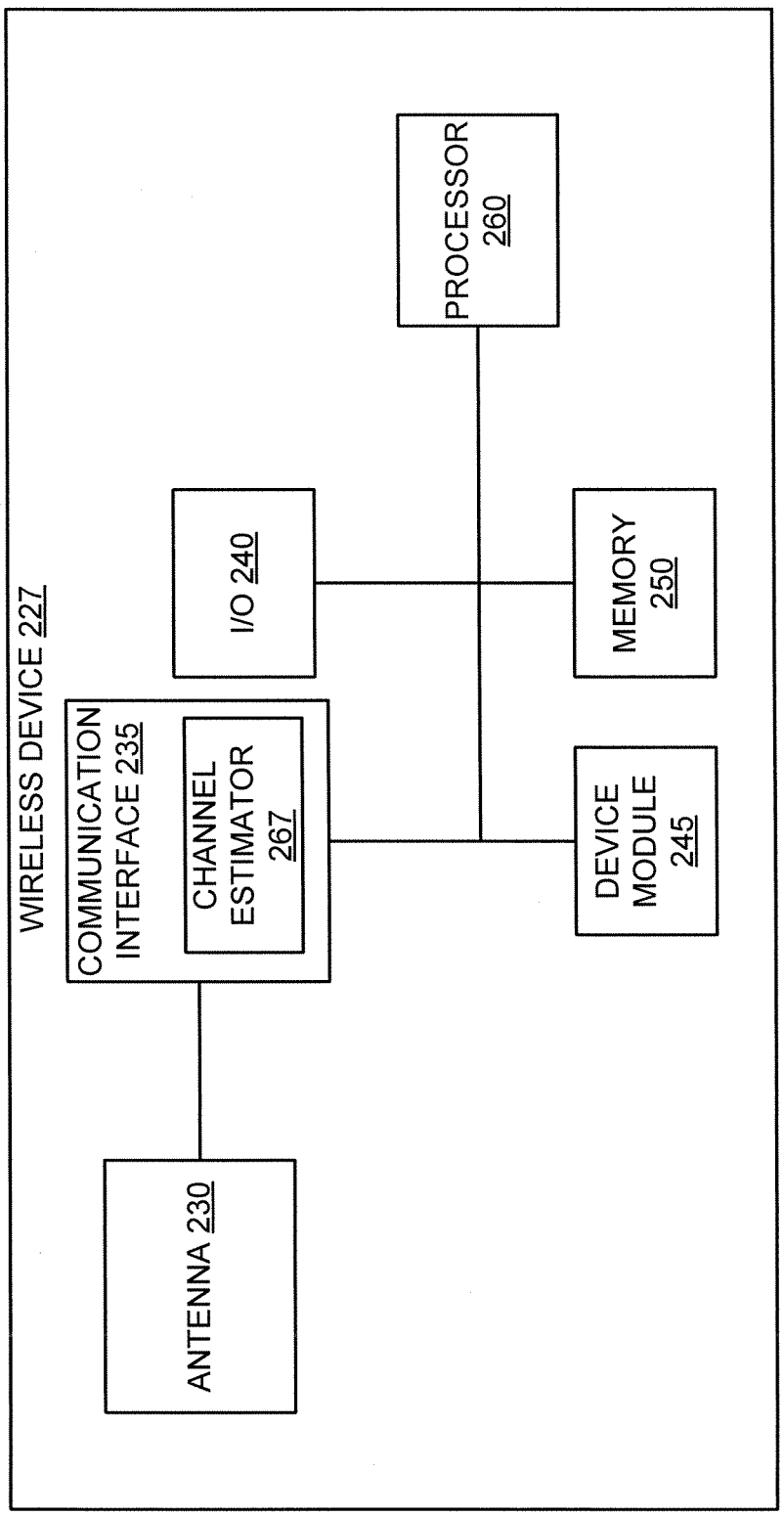
FIG. 3 is a block diagram of an example wireless device on which the invention might be implemented in accordance with one embodiment of the invention.

FIG. 3 is a diagram illustrating an example generalized configuration of a network device 227 with which channel estimation techniques can be implemented. The network device 227 in the illustrated example includes an antenna, a communication interface 235; a dedicated device module 245; memory 250; a processor 260; and an input output module 240. Communications interface 235 might be provided, for example, to allow the device 227 to communicate with other network devices. A communications transceiver, having a transmitter and receiver, might be included to allow two-way communications with other devices. In the case of an OFDM compatible device, the transceiver can be used to modulate data to be communicated onto the orthogonal carriers and to receive, downconvert and demodulate data from other devices. A channel estimation module 267 might also be provided to perform some or all of the channel estimation functions described herein. Such a module might be included as part of the functionality performed by communications interface 235 or processor 260 or other computing module.

A processor 260 and memory 250 might be included to facilitate device functionality. Take, for instance, a digital camera as a network device. This device might include one or more processors to control device operation and to process images for display and storage. A dedicated device module might also be included to facilitate device operations.

Memory of various forms or other storage devices might be included to allow storage of instructions for the processor, computational products, captured images and so on. The example illustrated in FIG. 3 also includes an I/O module 240 to allow other forms of communication.

From time-to-time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

The present invention in one embodiment is directed toward a system and method to allow flexible assignment of symbols for channel estimation. In general, a greater number of symbols dedicated to channel estimation, including pilot symbols inserted sparsely in the PSDU symbols, enable the generation of more reliable channel estimates and the determination of carrier frequency offsets. For packets that are transmitted via frequency hopped signals, the number of symbols for yielding reliable channel estimates for specific bands is taxed by virtue of the plurality of bands. For example, with the WiMedia PHY specification, six CE symbols are allocated for channel estimation. For a non-frequency hopped transmission, all six symbols can be used for channel estimation. Consider, however, what occurs when the transmission is frequency hopped across three bands. In this case, each band has only two CE symbols for channel estimation.

Accordingly, the invention, in one embodiment, serves to allocate additional preamble symbols to the task of channel estimation, to increase the average number of symbols available per frequency band.

For example, in one implementation in the example environment, a packet might be sent via a frequency-hopped transmission that uses three frequency bands. For clarity of discussion in this example, these bands are referred to as bands 1, 2, and 3. One example of a possible allocation of three bands to PFS and CE symbols is illustrated in FIG. 4. In this example, the hopped frequency pattern is 1, 1, 2, 2, 3, 3. Other patterns are possible.

As noted above, in this example, there are only six channel estimation symbols available for all three frequency bands. Thus, statistically speaking, there are only two CE symbols per band, although actual allocations may vary. However, in one embodiment the PFS symbols can be either reallocated or reused to provide additional symbols for channel estimation. For example, where six PFS symbols are reallocated, the effective amount of CE symbols is doubled.

Figure 5:
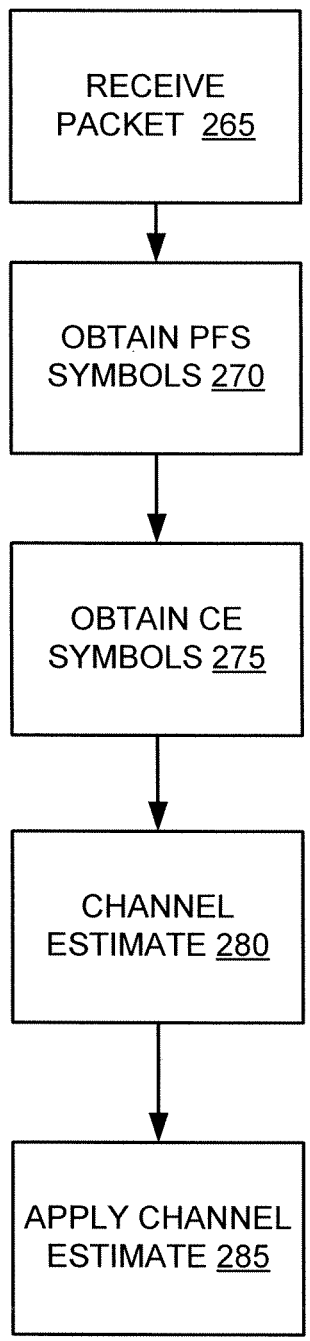
FIG. 5 is a functional block diagram illustrating an embodiment of channel estimation in accordance with one embodiment of the invention.

FIG. 5 is a diagram illustrating an example in which PFS symbols can be used to augment the CE symbols in accordance with one embodiment of the invention. Referring now to FIG. 5, in a step 265, the packet is received by the network device 227. In accordance with the above example, the packet might be an OFDM packet. Upon receipt of the packet, the network device 227 can undertake synchronization operations to determine a location of data in the header and for clocking operations. Various techniques might be used for synchronization, depending on the network or communication channel, including for example, Time Frequency Code modulation schemes.

Symbol synchronization for example, enables a device to determine start and end times for individual OFDM symbols with a relatively good degree of precision. Accordingly, the symbol synchronization result defines the DFT window, i.e., the set of samples in an OFDM symbol. Typically, a synchronization might involve acquiring symbol timing, frequency offset and carrier phase for the incoming signal. As these values are typically unknowns prior to signal acquisition, the synchronization process might be used to determine these elements such that detection is possible.

In one embodiment, after symbol synchronization is performed, frame synchronization is performed at the receiver using the frame synchronization symbols. In some applications, not all PFS symbols are required for adequate frame synchronization. For example, in one embodiment frame synchronization only requires a minimum of 6 PFS symbols to be available. Hence, the remaining 6 PFS symbols can be reallocated or reused to improve the channel estimate.

Channel estimation might typically be done after frame synchronization, but sometimes might be done in parallel with synchronization, as described further below—again, provided that parallelization allows for removal of relevant frequency offsets. Although, where conventional channel estimation algorithms are used with the invention, such algorithms might perform better where synchronization has been completed in advance.

In steps 270 and 275, the synchronized device can extract the CE symbols and PFS symbols from the packet. For example, having performed frame synchronization, the device can determine the boundary between the preamble and the CE symbols, and can accordingly identify the locations of the relevant symbols.

In one embodiment, to improve the channel estimation, some of the PFS symbols are reallocated to channel estimation or utilized for both frame synchronization and channel estimation. As one example, in one embodiment six PFS symbols are used with the existing CE symbols for channel estimation. Accordingly, in this example, there are twelve total symbols that can be used for channel estimation, and these twelve symbols might be dividing among the various frequencies over which the transmission is hopped. For example, with twelve symbols available for channel estimation and frequency hopping on three bands, the system has an average of four symbols per band. Other allocations of symbols to the bands are possible, but one embodiment divides them evenly.

The symbols can also be distributed flexibly. For example, in one embodiment the symbols allocations are distributed among the bands in a 1,2,3,1,2,3 . . . arrangement. In another embodiment, the symbols are distributed among the bands in a 1,1,1,1,2,2,2,2,3 . . . arrangement. As these examples serve to illustrate, any of a number of permutations of such distributions are possible. One consideration, however, is the amount of time it may take for synchronization on a given channel or in a given scenario. Where synchronization may occur later, the device might not be able to utilize each of the otherwise available symbols for channel estimation. As such to front-end load one band into the allocation (as was done with Band 1 in the latter of the above two examples) might mean that the front-end loaded band has fewer effective channels available for synchronization.

As another alternative, if frame synchronization starts at the last 12 PFS symbol, all 12 PFS symbols can also be used for channel estimation. In one embodiment, this can be done by computing channel estimate from the first 6 symbols, then computing the channel estimate for the last six symbols, then averaging the computed channel estimates. Such an embodiment might accordingly be implemented in such a way that no additional memory is required because a set of estimates is replaced by another set.

In step 280, the network device 227 combines the information from the symbols to determine the channel estimate. In one embodiment, a plurality of CE symbols for a given band can be combined with one another and a channel estimate computed; a plurality of PFS symbols combined and a second channel estimate computed therefrom; and the first and second channel estimates can be combined. For example, in one embodiment, the first and second estimates are combined by averaging. In one embodiment, the device performs channel estimation for each set of symbols in the same manner as it might otherwise be performed with only the CE symbols, but the additional symbols are available for a second estimate.

In a step 285, the channel estimate is applied to the receiver to optimize, or at least improve, the reception. For example, in one embodiment, n samples y1, . . . , yn, might be received. The samples can be corrected by the channel estimates obtained in the earlier steps. In one embodiment, the channel estimates can be an average of the channel estimate symbols allocated to the band. In embodiments where both PFS and CE symbols are used for the ultimate Channel Estimate, the sets of symbols can be averaged to compute the channel estimates and the estimates combined to compute a final channel estimate.

Figure 6:
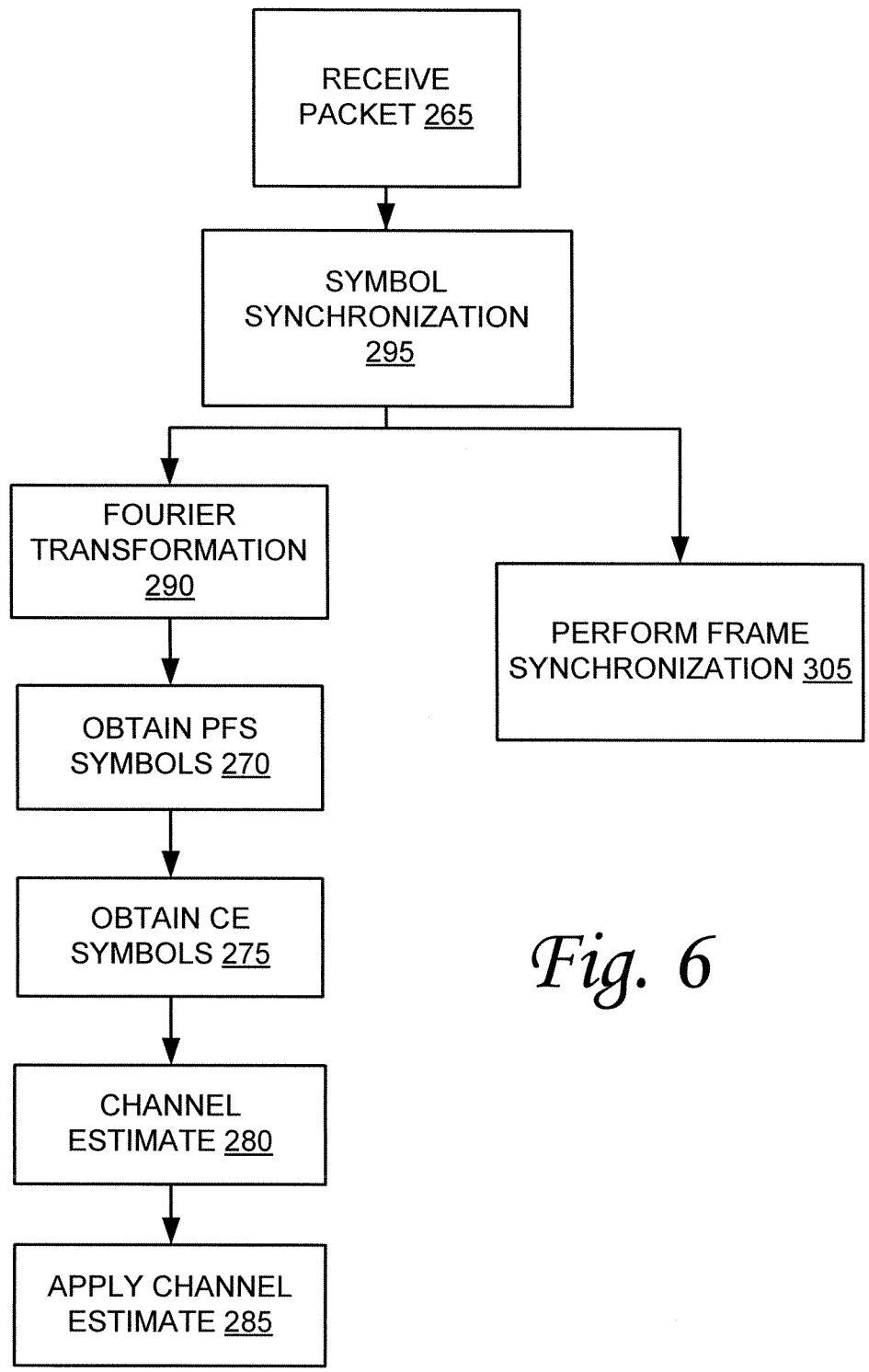
FIG. 6 is a functional block diagram illustrating an embodiment of channel estimation in accordance with one embodiment of the invention.

FIG. 6 is a diagram illustrating an example in which PFS symbols can be used to augment the CE symbols in accordance with one embodiment of the invention. More particularly, FIG. 6 illustrates an example embodiment wherein channel estimation is performed in parallel with frame synchronization, provided that parallelization allows for removal of relevant frequency offsets. Referring now to FIG. 6, in a step 295, a network device receives a packet. For example in one embodiment in accordance with the example environment, the packet received is a WiMedia packet. Upon receipt, the network device performs symbol synchronization to allow sampling of the received symbols at the correct time.

In a step 305, frame synchronization can be performed. Frame synchronization allows the device to identify the start of the frame in which the samples or symbol are contained. In one embodiment, this is accomplished using the series of known frame symbols in the preamble. Thus, the PFS symbols can be used for frame synchronization.

In the example illustrated in FIG. 6, the process of channel estimation is begun roughly in parallel with frame synchronization, provided that parallelization allows for removal of relevant frequency offsets. However, frame synchronization is normally performed in the time domain whereas channel estimation is done in the frequency domain. Hence, for channel estimation in one embodiment a Fast Fourier Transform is performed on the PFS symbols to convert them to the frequency domain.

Because the relative position in the packet for the PFS symbols is not known until frame synchronization is complete in one embodiment, it is useful to perform the Fast Fourier Transform, and to do frame synchronization and channel estimation in parallel, provided that parallelization allows for removal of relevant frequency offsets. However, to avoid undue computation and power consumption, one embodiment performs the Fast Fourier Transform only after symbol synchronization. This reduces the need to run Fast Fourier Transform all the time. Accordingly, in one embodiment Fast Fourier Transform will be run after a packet is detected and symbol synchronization is complete. Then the Fast Fourier Transform is running parallel to Frame Sync.

In a step 290, the network device 227 applies a Fourier Transform to the PFS and CE symbols. In one embodiment, as noted above, this might be a Fast Fourier Transform. The device 227 may then compute a channel transfer function for a given band based on both the PFS and CE symbols transmitted in the given band. With the transformation complete, in one embodiment this example continues with the process described above with respect to FIG. 5, in which the appropriate PFS and CE symbols are chosen and channel estimates are calculated, combined (for example, averaged) and applied to determine the channel estimate. Of course, for TFCs (Time Frequency Codes) that do not utilize frequency hopping, the network device 227 might be implemented to make this determination and compute a transfer function based only on the CE symbols, for example by computing an average of the observations of the six CE symbols in the same band.

Figure 7:
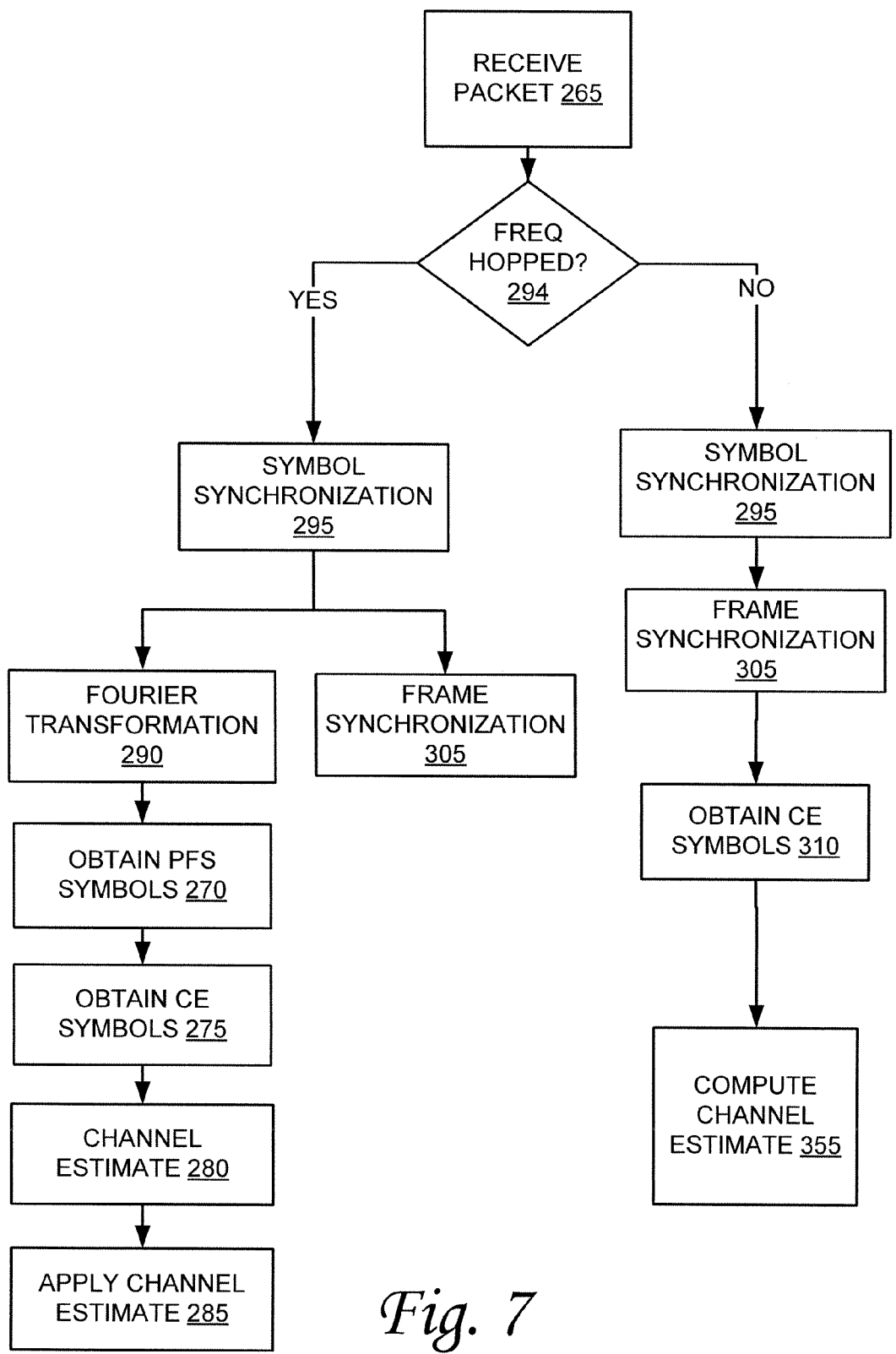
FIG. 7 is a functional block diagram illustrating an embodiment of channel estimation in accordance with one embodiment of the invention.

FIG. 7 illustrates another example implementation for channel estimation in accordance with one embodiment of the invention. In the example illustrated in FIG. 7, the device is configured to determine whether the signal is frequency hopped and then to apply channel estimation based on the results of that determination. Referring now to FIG. 7, in a step 265, the packet is received. In a step 294 the device 227 determines whether frequency hopping is present in a received packet. For example, different TFCs might have different requirements for frequency hopping and frequency hopping patterns, or might specify no frequency hopping.

If not, the device 227 performs channel estimation based on the CE symbols through steps 295, 305, 310 and 355. In one embodiment, this can be performed in accordance with conventional techniques.

If frequency hopping is present, the network device 227 proceeds to a perform channel estimation based on a reallocation or reuse of PFS symbols. For example, in the illustrated embodiment, this process is implemented to occur as set forth in FIG. 6.

Embodiments described above illustrate examples where six or twelve PFS symbols are used to augment channel estimation, however, other allocations are possible. As a further example, in another embodiment, only the last three PFS symbols might be used to improve the channel estimate. This might be possible where, for example, the frequency hopping pattern is 1, 2, 3, 1, 2, 3, as illustrated in FIG. 8. The final three PFS symbols in the packet/frame synchronization sequence 202 are spread among all three bands. Thus, the channel estimate can be improved for all bands by including the PSF symbols in the channel estimation as discussed above.

In any of the above described embodiments, the channel estimation module can employ a least squares (LS) estimator, a low-pass-filtered LS estimator, a least minimum mean square error (LMMSE) estimator, or any other estimator.

In another embodiment of the invention historical information might be used to facilitate channel estimation. For example, when in burst bode, a first packet may be followed by up to 16 subsequent packets. These packets are generally all from the same source device. Further, these packets can all be for the same destination device. While the contents of the packets may vary, it might be assumed that for each of the packets the channel conditions are almost the same. Because the channel conditions are likely to be almost the same or similar for each of these packets the effects of the channel on the packets are also likely to be similar. Accordingly, one embodiment might be implemented to use the channel estimates from previous packets to improve the estimate for the current packet.

Figure 9:
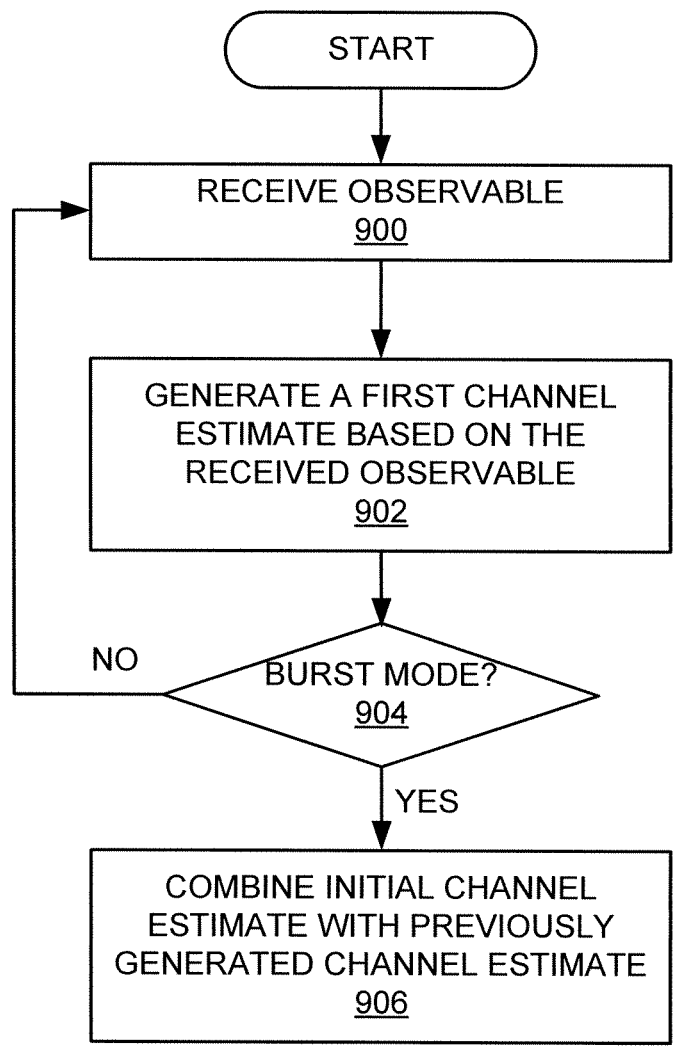
FIG. 9 is a flowchart that illustrates one example method for channel estimating using a previous packet to improve the estimate for a current packet.

FIG. 9 is a flowchart that illustrates one example method for channel estimating using a previous packet to improve the estimate for a current packet in accordance with one embodiment of the invention. Referring now to FIG. 9, in step 900 an observable is received. In step 902 a first channel estimation is generated based on the observable received in the step 900. The term first channel estimate is not intended to imply the first channel estimate in time. It is intended, at least in one embodiment, to mean a channel estimate that may be output from an estimator and based on a single received observable. It will be understood, however, that in another embodiment the systems and methods described herein can be combined in various other ways. For example, in another embodiment, some number of observables can be combined to make a first channel estimate. This first channel estimate may then be combined with previous channel estimates to calculate a combined channel estimate. In other words, in one embodiment, the method of FIG. 9 might be combined with the methods of FIG. 10, discussed below, to create a hybrid system.

In one embodiment a more refined linear estimator usually starts from an LS estimate, but the LS estimate can be improved by combining the new channel observations with past ones; this includes the case when the refinement of an LS estimate is simply a low pass filtered version of itself.

Further, in a variation of this scheme, the channel observations made in one of the hopped bands, and based on channel estimation OFDM symbols sent in that band and carrying all pilot tones, can be refined before the next channel estimation symbol for that hopped band arrives; the refinement can be based on the sparse pilots inserted in the payload OFDM symbols. Such a refined channel estimate obtained in one packet of a burst can also be based on refined observations combined as above, the refined observables can also be used as input to another channel estimator such as an LMMSE estimator.

The first channel estimate generated in step 902 based on the observable received in step 900 might be, for example, generated using a least squares ("LS") estimator, a low-pass filtered LS estimator, a least minimum mean squares ("LMMSE") estimator, or just about any other estimator.

When not in burst mode the method may continue looking for additional observables as illustrated by step 900. Additionally, when not in burst mode, the first channel estimate generated based on a received observable, as illustrated in step 902, may be used as a channel estimate. In other words, when not in burst mode a single observable may be used to generate a channel estimate. When in burst mode each observable can be used to calculate a channel estimate and multiple channel estimates may be used to generate a composite or combined channel estimate.

Channel estimates generated using an estimator may be combined with previously generated channel estimates as illustrated by a step 906. Channel estimates can be combined in a number of ways. For example, in one embodiment a simple average can be used. For example, one embodiment can take advantage of the low Doppler expected in ultra-wideband ("UWB") personal area network ("PAN") applications by simply averaging the sparse channel observations made on the sparse pilot tones during the payload OFDM symbols. For example, twelve channel observations are made on the sparse pilot tones in WiMedia MB-OFDM. In one embodiment these refined observations can be subsequently diversity-combined with new channel observations from subsequent burst packets. These refined observables derived from sparse pilots can be passed to a channel estimator, along with the observables from tones that do not carry spare pilots.

In another embodiment a weighted average can be used. For example, an aging of previous channel estimates might be used. An aging may be defined as a weighted average that varies as the samples get older. In one embodiment only channel estimates from the current burst are used. In another embodiment channel estimates from previous bursts might be used. For example, previous channel estimates that may be from the same transmitter and receiver can be used if available.

In one embodiment the first channel estimate (e.g., from the first packet) may not get the potential benefit of being combined with other previously generated channel estimates. For example, in one embodiment the first channel estimate generated in step 902 based on the received observable can be passed through without combining with any other channel estimate. This may occur, for example, when a device first receives an observable or when a device receives a first observable of a given set of packets, for example, while in burst mode.

In another embodiment a generic "seed" value can be used in place of any earlier or previously generated channel estimate. For example, the seed value might be based on some estimated channel characteristic or some long term average of various channels used by a system. The "seed" value may vary from implementation to implementation.

In one embodiment an older value can be used in place of the previously generated channel estimate. For example, the previously generated channel estimate might be whatever happened to be stored. This value may be, for example, a previously generated channel estimate for another transmitter. This might allow the combined channel estimate to be calculated the same way each time it is calculated, however, the initial estimate, or even several initial estimates might not be as accurate because of the possibly unrelated channel estimates that might be used in the calculations.

In another embodiment an older value can be used in place of the previously generated channel estimate, however, the older value selected may be an older value calculated during a previous transmission between the same transmitter and receiver. This may allow the initially generated channel estimation to be more accurate. This might be especially true if the transmission between the transmitter and receiver is a recent transmission, for example.

In one embodiment extra memory may be necessary to store one or more previously generated channel estimates. In another embodiment one or more previous channel estimates can be combined and stored as a single composite channel estimate. In yet another embodiment the combined channel estimate may be calculated and stored such that additional memory is not necessary. For example, each calculated channel estimate based on the first channel estimate and a previously generated channel estimate might over write the last channel estimate.

In one embodiment the first packet might not benefit from channel estimates from previous packets, however, in this embodiment each of the subsequent packets may benefit from channel estimates from previous packets. In another embodiment, however, the first packet may benefit from channel estimates from previous packets. For example, in one embodiment channel estimates from previous bursts can be used to improve the channel estimation for the first packet of a new burst.

In one embodiment channel estimates may be combined with new ones from the most recent packet using a weighting or aging factor. For example, the channel estimates can be weighted or aged throughout the burst. In one embodiment the weighting or aging factor can be applied to previous channel estimates after the current channel estimate is output from the channel estimator. In one embodiment, rather than combining channel estimates, old channel observables from previous burst packets can be combined with new ones from the most recent packet.

Figure 10:
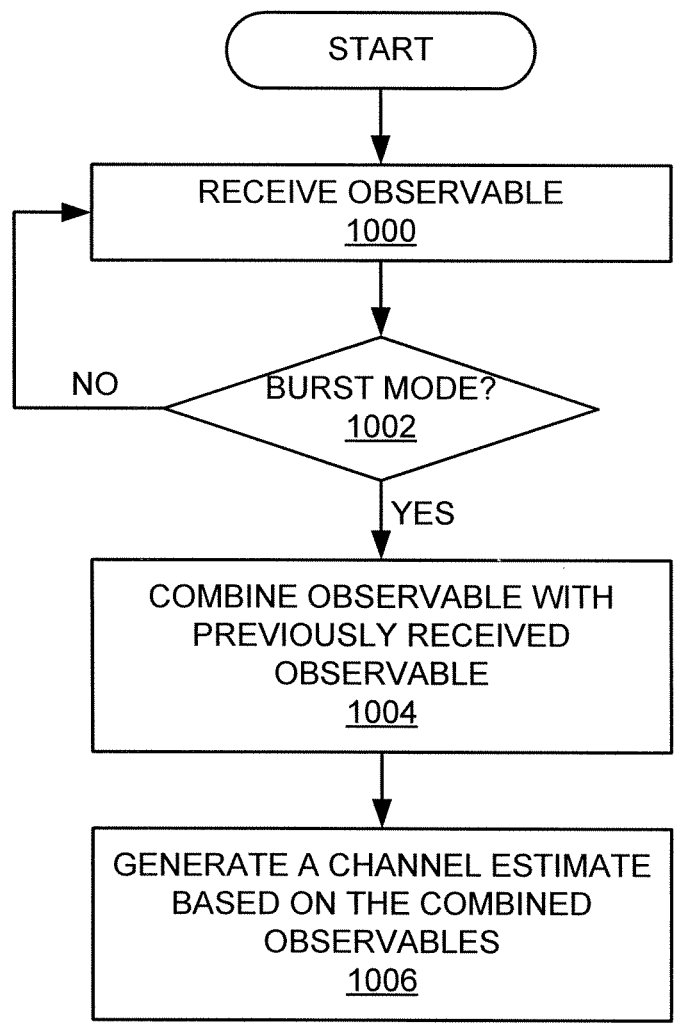
FIG. 10 is another flowchart that illustrates another example method for channel estimating using a previous packet to improve the estimate for a current packet.

FIG. 10 is a flowchart that illustrates one example method for channel estimating using previous packets to improve the estimate for the current packet in accordance with one embodiment of the invention. In step 1000 an observable is received. In step 1002 it is determined if the current packet is a burst mode packet. When in burst mode, in step 1004, the observable received in step 1000 is combined with previously received observables. One or more previously received observables may be combined. In step 1006 a channel estimates is generated based on the combined observables of step 1004. When not in burst mode the method may continue looking for additional observables as illustrated by step 1000. Additionally, when not in burst mode, a received observable may be used to generate a channel estimate (not shown). In other words, when not in burst mode a single estimate may be used to generate a channel estimate. When in burst mode multiple observables may be used to generate a composite or combined channel observable. The composite or combined channel observable may be input into an estimator to generate a channel estimate.

As discussed, channel estimates can be combined in a number of ways. For example, in one embodiment a simple average can be used. In another embodiment a weighted average can be used. For example, an aging of previous channel estimates may be used. An aging may be defined as a weighted average that varies as the samples get older.

In one embodiment only channel estimates from the current burst are used. In another embodiment channel estimates from previous bursts can be used. For example, previous channel estimates that may be from the same transmitter and receiver may be used.

In one embodiment the first channel estimate (e.g., from the first packet) may not get the potential benefit of being generated by a combination of multiple observables. For example, in one embodiment the first observable can be passed through without combining it with any other observables. This can occur, for example, when a device first receives an observable or when a device receives a first observable of a given burst mode set of packets.

In another embodiment a generic "seed" value may be used in place of any earlier or previously generated combined observables. For example, the seed value may be based on some estimate or some long term average of various observables. The "seed" value can vary from implementation to implementation.

In another embodiment an older value can be used in place of a previous observable or combination of observables. For example, the previous observable used might be whatever happened to be stored. This value may be, for example, a previous observable or combination of observables for another transmitter. This might allow the combined channel estimate to be calculated the same way each time it is calculated, however, the initial estimate, or even several initial estimates may not be as accurate because of the possibly unrelated observable that may be used to calculate the channel estimate.

In another embodiment an older value can be used in place of the previously calculated combined channel observable value, however, the older value selected may be an older value calculated during a previous transmission between the same transmitter and receiver. This might allow the initially generated channel estimation to be more accurate. This might be especially true if the transmission between the transmitter and receiver is a recent transmission, for example.

It will be understood by those of ordinary skill in the art that the systems and methods described can be implemented in hardware, software, or some combination of hardware and software. Additionally, the software might run on one or more processors, microprocessors, controllers, microcontrollers, etc.

In one embodiment the first packet may not benefit from channel estimates from previous packets, however, in this embodiment each of the subsequent packets might benefit from channel estimates from previous packets. In another embodiment, however, the first packet may benefit from channel estimates from previous packets. For example, in one embodiment channel estimates from previous bursts may be used to improve the channel estimation for the first packet of a new burst.

In one embodiment channel estimates can be combined with new ones from the most recent packet using a weighting or aging factor. For example, the channel estimates can be weighted or aged throughout the burst. In one embodiment the weighting or aging factor can be applied to previous channel estimates after the current channel estimate is output from the channel estimator.

Accordingly, as discussed with respect to FIGS. 9 and 10, in one embodiment, previous history information, such as previous observables or pervious channel estimates may be used to generate combined observables or combined channel estimates when in burst mode. This history information, at least in some embodiments, is not used when not in burst mode.

In one embodiment burst mode may be determined by reading a burst mode flag in the PHY header. The flag in the PHY header indicates that the message is a burst mode message. In another embodiment the source identification can be used. For example, if the source identification is the same the history will include channel information over the same channel. It will be understood by those of ordinary skill in the art that "same channel" does not necessarily mean the identical channel. Characteristics of a channel might vary over time, as a source and destination pair of devices move, both in geographic location and relative to each other. In one embodiment the same channel may be a substantially correlated channel.

Further, as used herein "same channel" the communication channels includes similarly situated devices or pairs of devices. For example, if two transmitters are known to be near each other they may have similar channel characteristics. Accordingly, if a receiving device, R1, is receiving transmissions from transmitting devices, T1 and T2 it might be able to used channel or observable information from T1 to improve receptions from T2 and channel or observable information from T2 to improve receptions from T1 if, for example, T1 and T2 are happen to be close to each other. How close T1 and T2 need to be to each other may vary from implementation to implementation. In another embodiment R1 might assume T1 and T2 are close together and determine if an improvement in channel estimation occurs by using the methods described above. Further, in one embodiment multiple receivers may be able to share channel or observable information about one or more channels, for example, when the receivers are close together.

Figure 11:
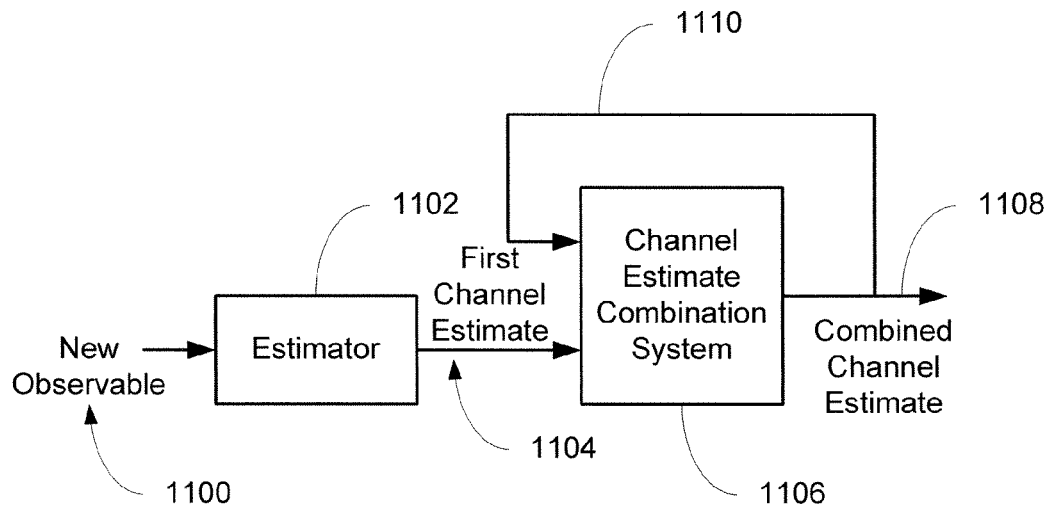
FIG. 11 is a functional block diagram illustrating an embodiment of a system that determines a combined channel estimation in accordance with the methods of FIG. 9.

FIG. 11 is a functional block diagram illustrating an embodiment of a system that determines a combined channel estimation in accordance with the methods of FIG. 9. A new observable 1100 is entered into an estimator 1102. In one embodiment estimator 1102 may be a channel estimator such as a least squares ("LS") estimator. In another embodiment a low pass filtered LS estimator may be used. In yet another embodiment a least minimum mean square error ("LMMSE") estimator may be used. In one embodiment almost any other estimator might be used.

As discussed above, the first channel estimate 1104 is not intended to imply the first channel estimate in time. It is intended, at least in one embodiment, to mean a channel estimate that might be output from an estimator and based on a single received observable. It will be understood, however, that in another embodiment the systems and methods described herein might be combined in various other ways. For example, in another embodiment, some number of observables may be combined to make a first channel estimate. This first channel estimate may then be combined with previous channel estimates to calculate a combined channel estimate. In other words, in one embodiment, the system of FIG. 11 might be combined with the system of FIG. 12, discussed below, to create a hybrid system.

The first channel estimate 1104 is input into a channel estimation combination system 1106. The channel estimation combination system may combine two or more first channel estimates, for example, by combining channel estimate 1104 and combined channel estimate 1108 by using feedback loop 1110. In one embodiment a simple average can be used. In another embodiment a weighted average can be used. For example, an aging of previous channel estimates may be used. An aging may be defined as a weighted average that varies as the samples get older. Additional possibilities are discussed with respect to FIG. 9.

Figure 12:
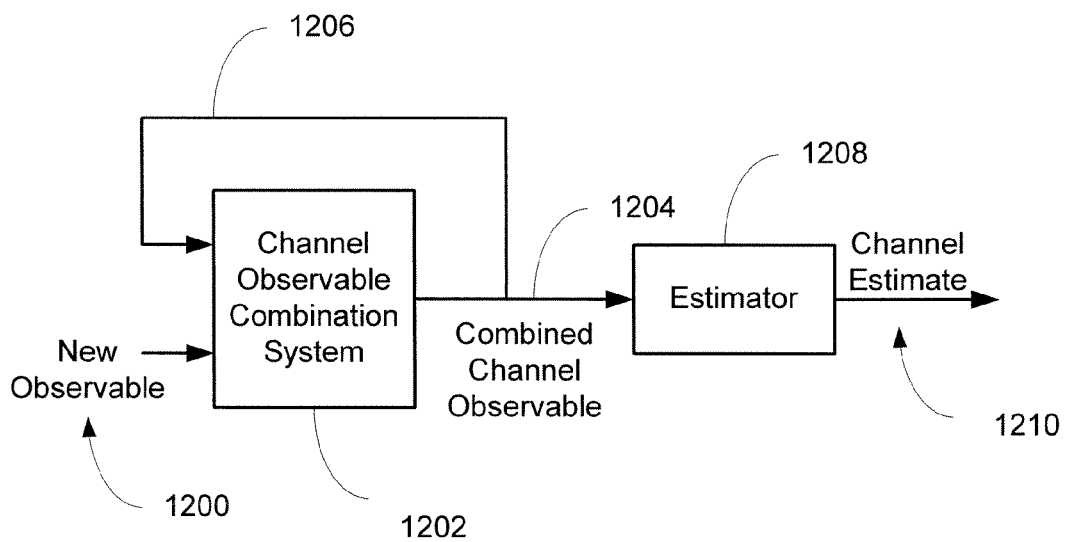
FIG. 12 is a functional block diagram illustrating an embodiment of a system that determines a channel estimation based on combined channel observables in accordance with the methods of FIG. 10.

FIG. 12 is a functional block diagram illustrating an embodiment of a system that determines a channel estimation based on combined channel observables 1200 in accordance with the methods of FIG. 10. A new observable 1200 is an input of channel observable combination system 1202. The channel observable combination system 1202 outputs a combined channel observable 1204 based on the new observable 1200 and the feed back combined channel observable 1206.

The combined channel estimator 1204 is input into an estimator 1208. Estimator 1102 may be, for example, an LS estimator, a low-pass filtered LS estimator, an LMMSE estimator, or just about any other estimator. Estimator 1208 outputs a channel estimate 1210.

Figure 13:
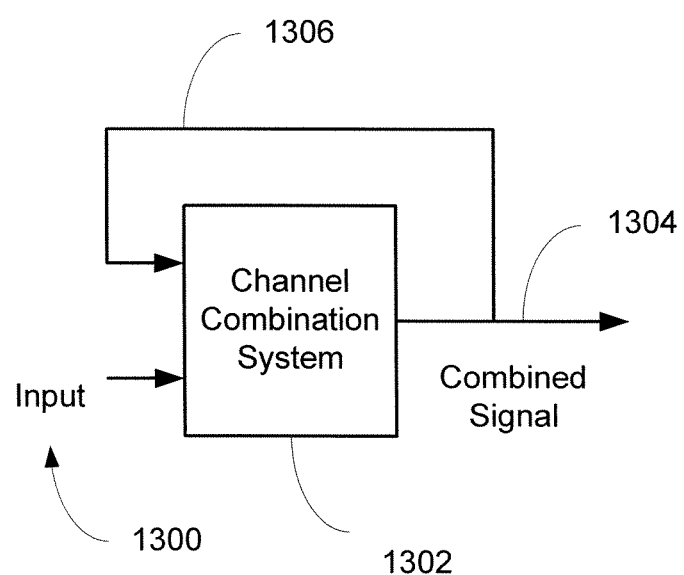
FIG. 13 is a functional block diagram illustrating a portion of an embodiment of a system that determines a channel estimation that might allow for lower memory requirements.

FIG. 13 is a functional block diagram illustrating a portion of an embodiment of channel estimation that might allow for lower memory requirements. While in one embodiment extra memory may be necessary to store one or more previously generated channel estimates or other channel observables. In another embodiment, as illustrated by FIG. 13, one or more channel estimates, or channel observables, depending on the specific implementation, can be combined and stored such that additional memory is not necessary. For example, each calculated channel estimate based on the first channel estimate and a previously generated channel estimate might over write the last channel estimate.

In one embodiment, each packet that arrives can use the stored combined estimates or observables from past packets and can refine them with information gained from the new channel estimation symbols in the current packet, possibly including the observables due to the sparse pilot tones in past payload OFDM symbols. The systems and methods described herein may be applicable in hopped scenarios, where only two channel estimation symbols are available.

As illustrated an input 1300 can be input into a channel combination system 1302. The input 1300 can be a first channel estimate or a new observable, depending on the specific embodiment. Accordingly, the channel combination system 1302 can be a channel estimation combination system or a channel observable combination system depending on the specific embodiment. The output 1304 of the channel combination system 1302 may be feed back as an input of channel combination system 1302 using feedback loop 1306.

Channel observable combination system 1202 may, in one embodiment, use a simple average. In another embodiment a weighted average may be used. For example, an aging of previous channel estimates may be used. An aging may be defined as a weighted average that varies as the samples get older. Additional possibilities are discussed with respect to FIGS. 9 and 10.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof, the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method of channel estimation comprising:
a first network device receiving a packet comprising a sequence of packet frame synchronization symbols and a sequence of channel estimation symbols transmitted on a channel by a second network device;
the first network device receiving an observable from a channel estimation or packet frame synchronization symbol of the received packet;
the first network device generating a first channel estimate for the channel based on the received observable; and
the first network device combining the first channel estimate for the channel with a previously generated channel estimate for the channel;
wherein the previously generated channel estimate was generated based on a previously received observable from a previously received channel estimation or packet frame synchronization symbol of a previously received packet transmitted on the channel by the second network device; and
wherein the received packet and previously received packet are packets transmitted in a burst of packets during a burst mode of communications between the first network device and the second network device.

2. The method of claim 1, wherein the combination of channel estimates comprises an average of the channel estimates.

3. The method of claim 1, wherein the combination of the channel estimates comprises applying a weighting factor to the channel estimates.

4. The method of claim 1, wherein the combination of the channel estimates comprises applying an aging factor to the channel estimates.

5. The method of claim 1, wherein the combination of the channel estimates comprises combining an initial channel estimate value with a seed value.

6. The method of claim 1, wherein the combination of the channel estimates comprises allowing an initial channel estimate value to pass through the system without being combined with another channel estimate value.

7. The method of claim 1, wherein the channel estimates comprise channel estimates from an identical channel.

8. The method of claim 1, wherein the channel estimates comprise channel estimates from a time-varying channel.

9. The method of claim 1, wherein the channel estimates comprise channel estimates from substantially correlated channels.

10. The method of claim 1, wherein burst mode is determined using a flag in a physical layer header.

11. The method of claim 1, wherein burst mode is determined from a source identification.

12. A method of channel estimation comprising:
a first network device receiving a packet comprising a sequence of packet frame synchronization symbols and a sequence of channel estimation symbols transmitted on a channel by a second network device;
the first network device receiving an observable from a channel estimation or packet frame synchronization symbol of the received packet;
the first network device combining the observable with a previously received observable from a previously received channel estimation or packet frame synchronization symbol transmitted on the channel by the second network device; and
the first network device generating a channel estimate based on the combined observables;
wherein the received packet and previously received packet are packets transmitted in a burst of packets during a burst mode of communications between the first network device and the second network device.

13. The method of claim 12, wherein the combination of observables comprises a simple average of the channel estimates.

14. The method of claim 12, wherein the combination of the observables comprises applying a weighing factor to the channel estimates.

15. The method of claim 12, wherein the combination of the observables comprises applying an aging factor to the channel estimates.

16. The method of claim 12, wherein the combination of the observables comprises combining an initial observable value with a seed value.

17. The method of claim 12, wherein the combination of the observables comprises allowing an initial observable value to pass through the system without being combined with another observable value.

18. The method of claim 12, wherein the channel estimates comprise channel estimates from an identical channel.

19. The method of claim 12, wherein the channel estimates comprise channel estimates from a time-varying channel.

20. The method of claim 12, wherein the channel estimates comprise channel estimates from substantially correlated channels.

21. The method of claim 12, wherein burst mode is determined using a flag in a physical layer header.

22. The method of claim 12, wherein burst mode is determined from a source identification.

23. An electronic receiver of a first network device comprising:
a receiver configured to receive a packet comprising a sequence of packet frame synchronization symbols and a sequence of channel estimation symbols transmitted on a channel by a second network device;
a channel combination system configured to combine observables or channel estimates wherein the observables or channel estimates are from the same channel; and
an estimator, coupled to the channel combination device and configured to convert an observable into a channel estimate, wherein the observables comprise a given observable from a channel estimation or packet frame synchronization symbol of the received packet and a previously received observable from a previously received channel estimation or packet frame synchronization symbol of a previously received packet and the channel estimates comprise a given channel estimate for the channel and a previously generated channel estimate for the channel; and wherein the received packet and previously received packet are packets transmitted in a burst of packets during a burst mode of communications between the first network device and the second network device.

24. The electronic receiver of claim 23, wherein the channel combination system comprises a channel estimation combination system configured to combine channel estimates, wherein the estimator is coupled to the channel estimation combination system and configured to convert an observable into a first channel estimate for input into the channel estimation combination system.

25. The electronic receiver of claim 23, wherein the channel combination system comprises a channel observable combination system configured to combine channel observables, and wherein the estimator is coupled to the channel observable combination system and configured to convert the combined channel observable output from the channel observable combination system into a channel estimate.

26. The electronic receiver of claim 23, wherein the estimator comprises an LS estimator.

27. The electronic receiver of claim 23, wherein the estimator comprises a low-pass filtered least squares (LS) estimator.

28. The electronic receiver of claim 23, wherein the estimator comprises an least minimum mean square error (LMMSE) estimator.

29. The electronic receiver of claim 28, wherein an LS estimate is used to initialize the LMMSE estimator.

30. The electronic receiver of claim 23, wherein the observables or channel estimates comprise observables or channel estimates from an identical channel.

31. The electronic receiver of claim 23, wherein the observables or channel estimates comprise observables or channel estimates from a time-varying channel.

32. The electronic receiver of claim 23, wherein the observables or channel estimates comprise observables or channel estimates from substantially correlated channels.

* * * * *